United States Patent [19]

Komatsu et al.

[11] Patent Number: 5,495,255
[45] Date of Patent: Feb. 27, 1996

[54] FM RADAR SYSTEM

[75] Inventors: Satoru Komatsu, Suginami; Hiroshi Kudo, Saitama, both of Japan

[73] Assignee: Honda Giken Kogyo Kabushiki Kaisha, Tokyo, Japan

[21] Appl. No.: 147,461

[22] Filed: Nov. 2, 1993

Related U.S. Application Data

[63] Continuation of Ser. No. 938,992, Sep. 2, 1992, abandoned.

[30] Foreign Application Priority Data

Sep. 4, 1991 [JP] Japan ..................... 3-253097

[51] Int. Cl.⁶ .......................... G01S 13/34; G01S 13/93
[52] U.S. Cl. .................. 342/175; 342/70; 342/128; 342/200; 455/73
[58] Field of Search ............................. 342/175, 70, 71, 342/72, 128, 200; 455/73, 80, 89, 90

[56] References Cited

U.S. PATENT DOCUMENTS

| | | | |
|---|---|---|---|
| 3,493,969 | 2/1970 | Bonnaval et al. | 342/128 |
| 4,319,244 | 3/1982 | Hirota et al. | 342/175 |
| 4,349,823 | 9/1982 | Tagami et al. | 342/70 |
| 5,008,678 | 4/1991 | Herman | 342/70 X |
| 5,115,245 | 5/1992 | Wen et al. | 342/175 |
| 5,181,037 | 1/1993 | Komatsu | 342/70 |

FOREIGN PATENT DOCUMENTS

| | | | |
|---|---|---|---|
| 0499270A2 | 8/1992 | European Pat. Off. . | |
| 0003061 | 1/1982 | Japan | 342/175 |

*Primary Examiner*—Gilberto Barrón, Jr.
*Attorney, Agent, or Firm*—Lyon & Lyon

[57] ABSTRACT

An FM radar system of more simple construction, smaller size, lower cost and improved performance is provided in which circulators of any type in the prior art are eliminated by constructing a transceiver comprised of a transmitting part and a receiving part, each formed on a common dielectric plate and having a dedicated transmitting antenna and a dedicated receiving antenna respectively. The antennas comprise planar array antennas, in contrast to the solid antennas used in prior art systems. The planar array antennas are also formed on the single dielectric plate. The transmitting part comprises a plurality of transmission antennas and a plurality of frequency multipliers coupled to said transmission antennas. The receiving part comprises a plurality of receiving antennas which are coupled to a plurality of switches through a plurality of mixers, frequency multipliers, and low noise amplifiers.

16 Claims, 4 Drawing Sheets

FM RADAR SYSTEM

BACKGROUND OF THE INVENTION

This is a continuation of application Ser. No. 07/938,992, filed on Sep. 2, 1992, now abandoned.

The present invention relates to FM radar systems, and in particular, to FM radar systems for use in collision avoidance systems.

A radar system which is mounted on a vehicle such as an automobile and used in conjunction with an alarm system to detect and warn of potential frontal and rear end collisions, must have high resolution and a minimum range of several decimeters. For this reason, it has been recognized that for use in collision warning systems, frequency modulated-continuous wave (FM-CW) radar systems are preferred over conventional pulsed radar systems. Further, as the longest required range of detection is roughly several hundred meters, it is preferred to utilize a beam having a frequency of about 60 GHz. The reasons for this are that beams having a frequency in the 60 GHz range are easily attenuated upon propagation, and that the use of such beams avoids interference with microwave transmission systems already in existence.

An exemplary prior art FM Radar System is disclosed in U.S. Pat. No. 5,181,037, entitled "FM Radar System." FIG. 4 is a block diagram of that system. As shown, a voltage of a triangular wave form is produced by sweep circuit 121, which operates under the control of timing control circuit 120. The triangular wave form voltage is supplied to a variable frequency oscillator 110 to produce a microwave FM signal. The FM signal is divided into two parts, each of which is supplied to an up-converter 112 or 113 respectively. The up-converters 112 and 113 convert each part of the divided signal to a microwave FM signal having a frequency in the range of about 20 GHz. Each of the converted FM signals is supplied to one of four frequency triple multipliers 114a–114d or one of four frequency triple multipliers 115a–115d successively through either of switches 122 or 123 which operate in sync with a timing signal supplied from the timing control circuit 120. FM mm-wave signals having a frequency of about 60 GHz, which are output successively from frequency triple multipliers 114a–114d, are supplied to antennas 118a–118d through circulators 116a–116d. The signals are then radiated from the antennas 118a–118d successively.

In addition, FM mm-wave signals which are output successively from frequency triple multipliers 115a–115d, are supplied successively to a first input terminal of mixers 117a–117d. FM mm-wave signals, which are reflected from a target and received by antennas 118a–188d, are supplied successively to a second input terminal of mixers 117a–117d through circulators 116a–116d. Beat signals, which are output successively from mixers 117a–117d, are supplied to detecting circuit 119 through switching circuit 124. The operating frequencies of local oscillators of the up-converters 112 and 113 are set to different values to shift the frequency of the beat signals output from mixers 117a–117d to a frequency range high enough to reduce interference from 1/f noise.

Since wave guide type circulators 116 are used in the FM radar systems of the prior art, an example of which is illustrated in FIG. 4, the size of prior art systems becomes large and the systems become expensive. Size of FM radar systems can be reduced by using microstrip type circulators instead of wave guide type circulators, however, the use of microstrip type circulators substantially increases the cost of an FM radar system.

In addition, it will be noted by those skilled in the art that sufficient isolation to suppress interference between transmitter and receiver cannot be realized using microstrip type circulators. Finally, microstrip type circulators have a large insertion loss.

SUMMARY OF THE INVENTION

Accordingly, it is an object of the present invention to provide an FM radar system of more simple construction, smaller size, lower cost, and improved performance by eliminating circulators of any type.

Another object of the invention is to provide an FM radar system of still smaller size and lower cost by utilizing microstrip line type transmitting and receiving antennas in conjunction with frequency multipliers and mixers of the same microstrip line type on the same dielectric plate.

Still another object of the present invention is to provide an FM radar system of still improved performance in which degradation of SN ratio of beat signals is avoided and accuracy of detection is improved.

These and other objects of the present invention will be attained by providing an FM radar system comprising:

a transmitting part having a first input terminal, a frequency multiplier for multiplying a frequency of an FM signal supplied to said first input terminal to provide an FM signal of raised frequency and a planar array antenna for transmitting said FM signal of raised frequency;

a receiving part having a planar array antenna for receiving FM signals of a similar frequency band as said transmitted FM signal, a second input terminal, a frequency multiplier for multiplying a frequency of an FM signal supplied to said second input terminal to produce an FM signal of raised frequency, a mixer for producing beat signals by mixing said produced FM signal of raised frequency and said received FM signal and an output terminal for outputting said produced beat signal;

wherein said transmitting part and said receiving part each comprise one part of a transceiver disposed on a single dielectric plate.

DETAILED DESCRIPTION OF THE PREFERRED EMBODIMENT

Figure 1:
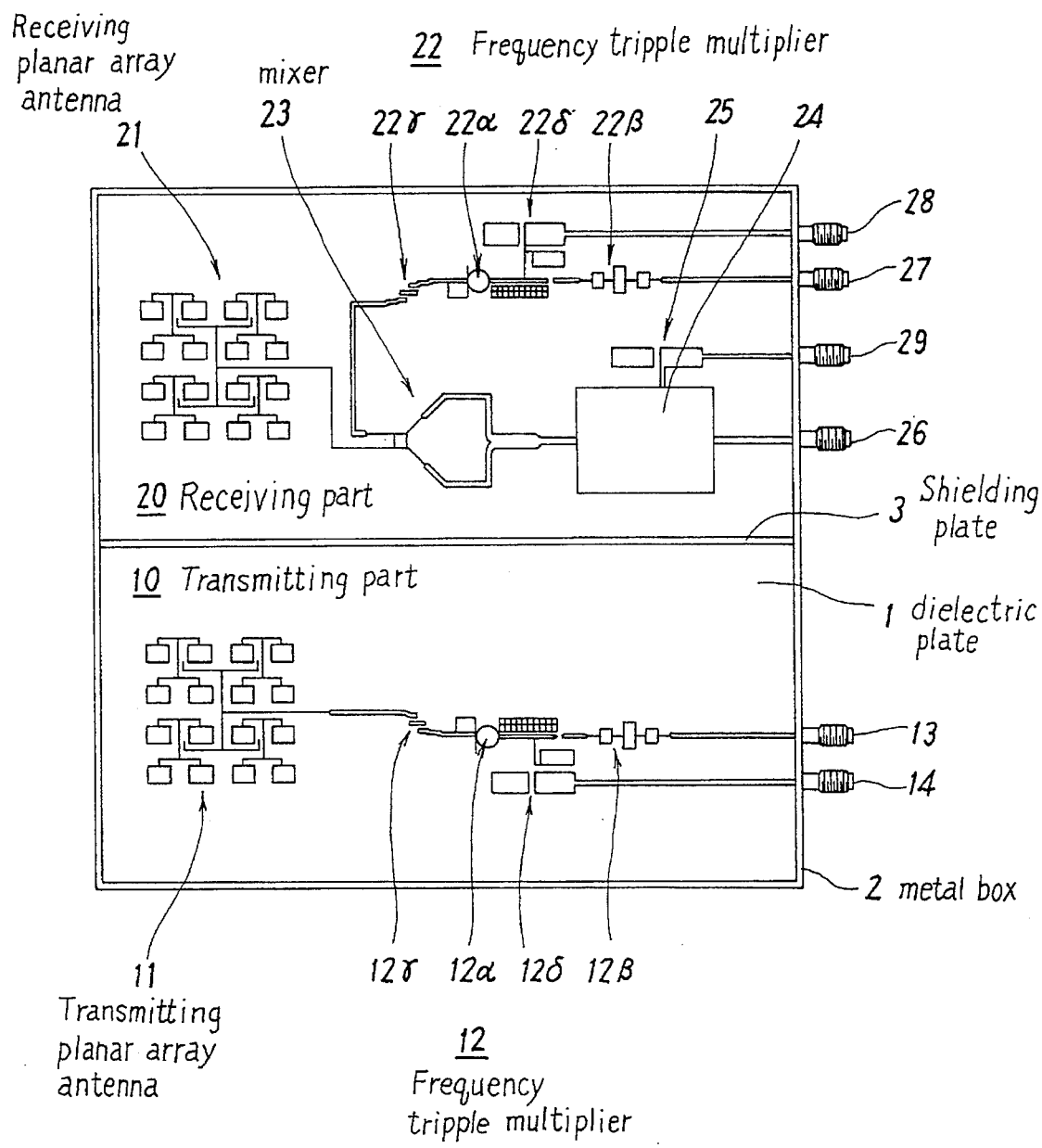
FIG. 1 is a top plan view showing a construction of a transceiver of an FM radar system according to one embodiment of the present invention.
Figure 2:
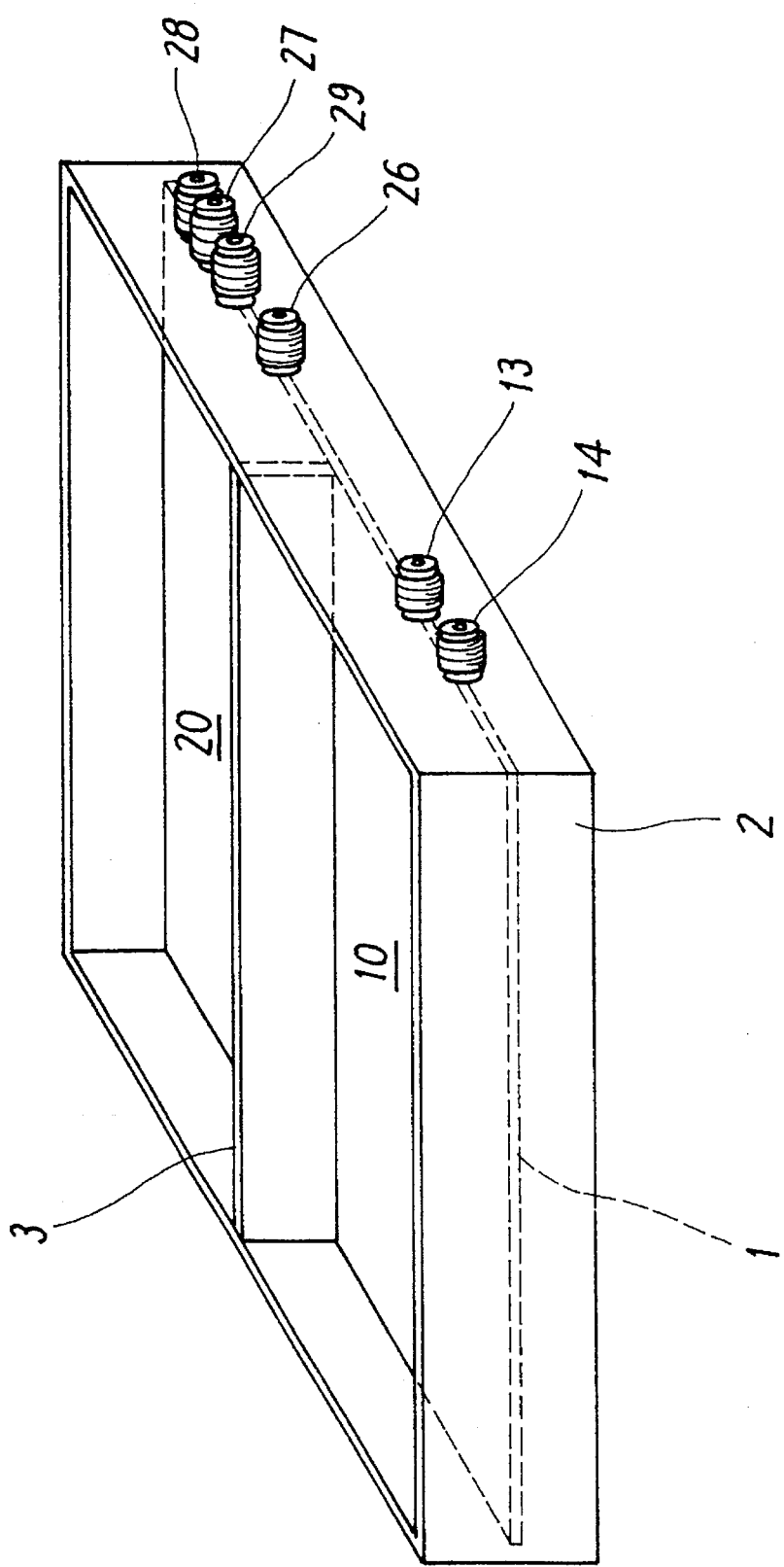
FIG. 2 is a prospective illustration showing a construction of a metal box for housing a transceiver of an FM radar system in accordance with one embodiment of the present invention.

In FIGS. 1 and 2, a top plan view of a transceiver of an FM radar system in accordance with one embodiment of the present invention and a perspective view of a metal box for housing the transceiver of an FM radar system in accordance with one embodiment of the present invention are shown respectively.

As shown, the transceiver comprises a transmitting part 10 and a receiving part 20 formed as a microstrip circuit on a common dielectric plate 1. The common dielectric plate 1 comprises an appropriate polymer having a relatively low dielectric constant (a dielectric constant of about 2 is exemplary) to promote radiation of electro-magnetic waves. In addition, the common dielectric plate 1 is supported in a metal box 2.

The transmitting part 10 and the receiving part 20 are separated from each other by a metal shield plate 3 to avoid interference between the respective parts 10 and 20.

The transmitting part 10 comprises a transmitting antenna 11 of a planar array type, a frequency triple multiplier 12 $\alpha$–$\delta$, input terminals 13 and 14 of a coaxial connector for receiving microwave FM signals and bias voltages respectively through coaxial cables (not shown in the Figs.), and transmission lines for forming connections between the above-listed various elements. The frequency triple multiplier 12 $\alpha$–$\delta$ comprises a multiplier element 12 $\alpha$, a low pass filter 12 $\beta$ for rejecting mm-wave signals, a band pass filter 12 $\gamma$ for rejecting higher order mm-wave and microwave signals, and a high rejection filter 12 $\delta$ for forming bias circuit and matching patterns for impedance matching.

The receiving part 20 comprises a receiving antenna 21 of the planar array type, a frequency triple multiplier 22 $\alpha$–$\delta$, a mixer 23 of single balanced type, a low noise amplifier 24 for amplifying beat signals, a high rejection filter 25 forming a bias circuit, an output terminal 26 forming a coaxial connector to output beat signals, an input terminal 27 of a coaxial connector to input microwave FM signals, bias input terminals 28 and 29, and transmission lines for forming connections between the above-listed various elements.

The frequency triple multiplier 22 $\alpha$–$\delta$ comprises a multiplier element 22 $\alpha$, a low pass filter 22 $\beta$ for rejecting mm-wave signals, a band pass filter 22 $\gamma$ for rejecting higher order mm-wave and microwave signals, and a high rejection filter 22 $\delta$ for forming bias circuit and matching patterns for impedance matching.

In the transmitting part 10, microwave FM signals having a frequency of about 20 GHz, which are supplied to the input terminal 13 through coaxial cable, are converted to mm-wave FM signals by the frequency triple multiplier 12 $\alpha$–$\delta$ for transmission by the planar array antenna 11. Matching patterns for impedance matching are formed around the frequency triple multiplier element 12 $\alpha$, and bias voltage is supplied from the bias input terminal 14 to the frequency triple multiplier element 12 $\alpha$ through the high rejection filter 12 $\delta$.

In the receiving part 20, mm-wave FM signals received by the receiving planar array antenna 21 are supplied to an input terminal of the mixer 23 which is of single balance type. Microwave FM signals having a frequency of about 19.5 GHz are supplied to the input terminal 27 through coaxial cable and are converted to mm-wave FM signals having a frequency of about 58.5 GHz by frequency triple multiplier 22 $\alpha$–$\delta$. The mm-wave FM signals are then supplied to another input terminal of the mixer 23.

Beat signals having a frequency of about 1.5 GHz which are output from the output terminal of the mixer 23, are amplified by the low noise amplifier 24 and are output to coaxial cable through the beat signal output terminal 26. Bias voltages, which are supplied to the bias input terminals 28 and 29, are supplied to frequency multiplier 22 $\alpha$–$\delta$ and the low noise amplifier 24 through the high rejection filters 22 $\delta$ and 25 respectively.

Figure 3:
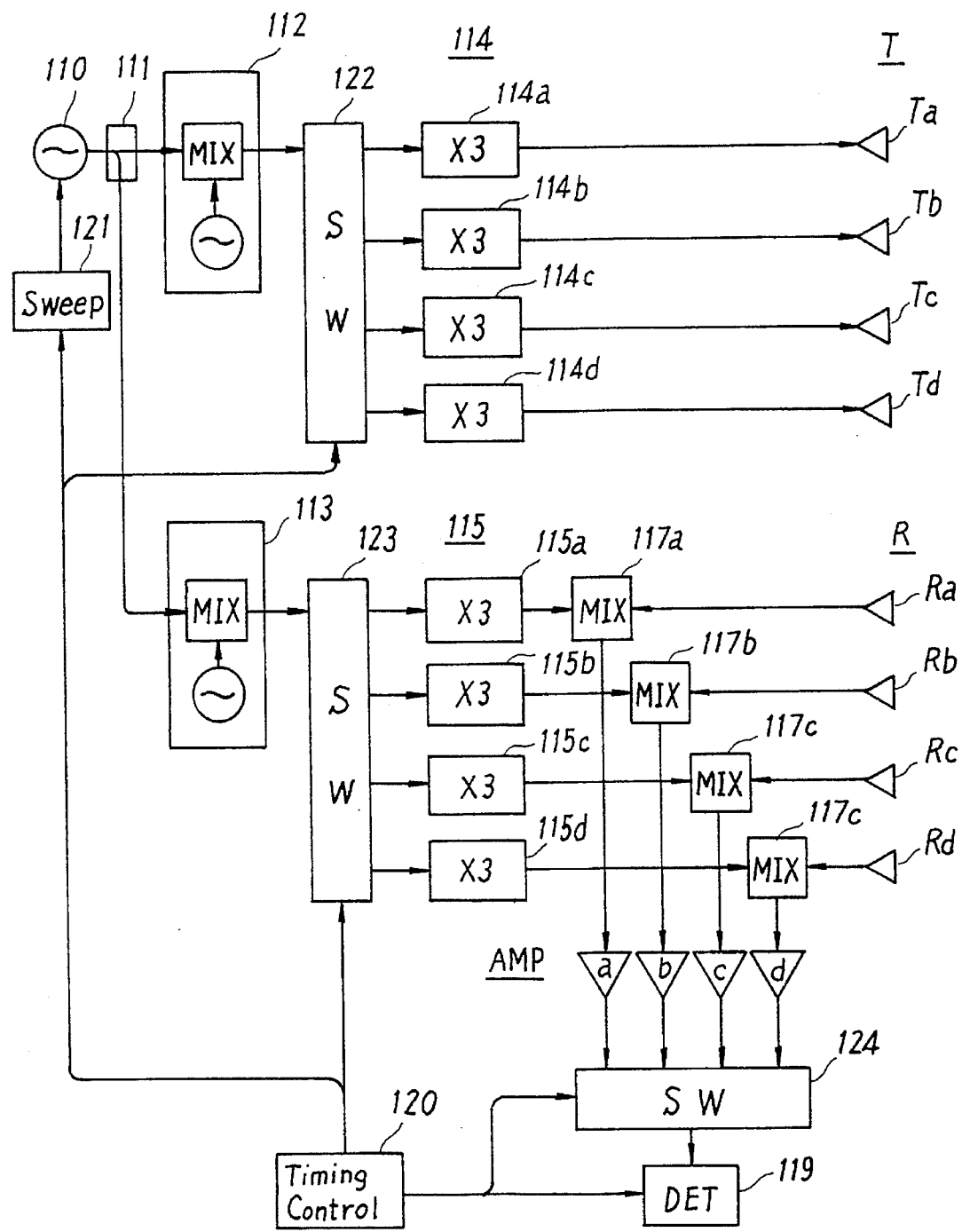
FIG. 3 is a block diagram of an FM radar system according to one embodiment of the present invention.
Figure 4:
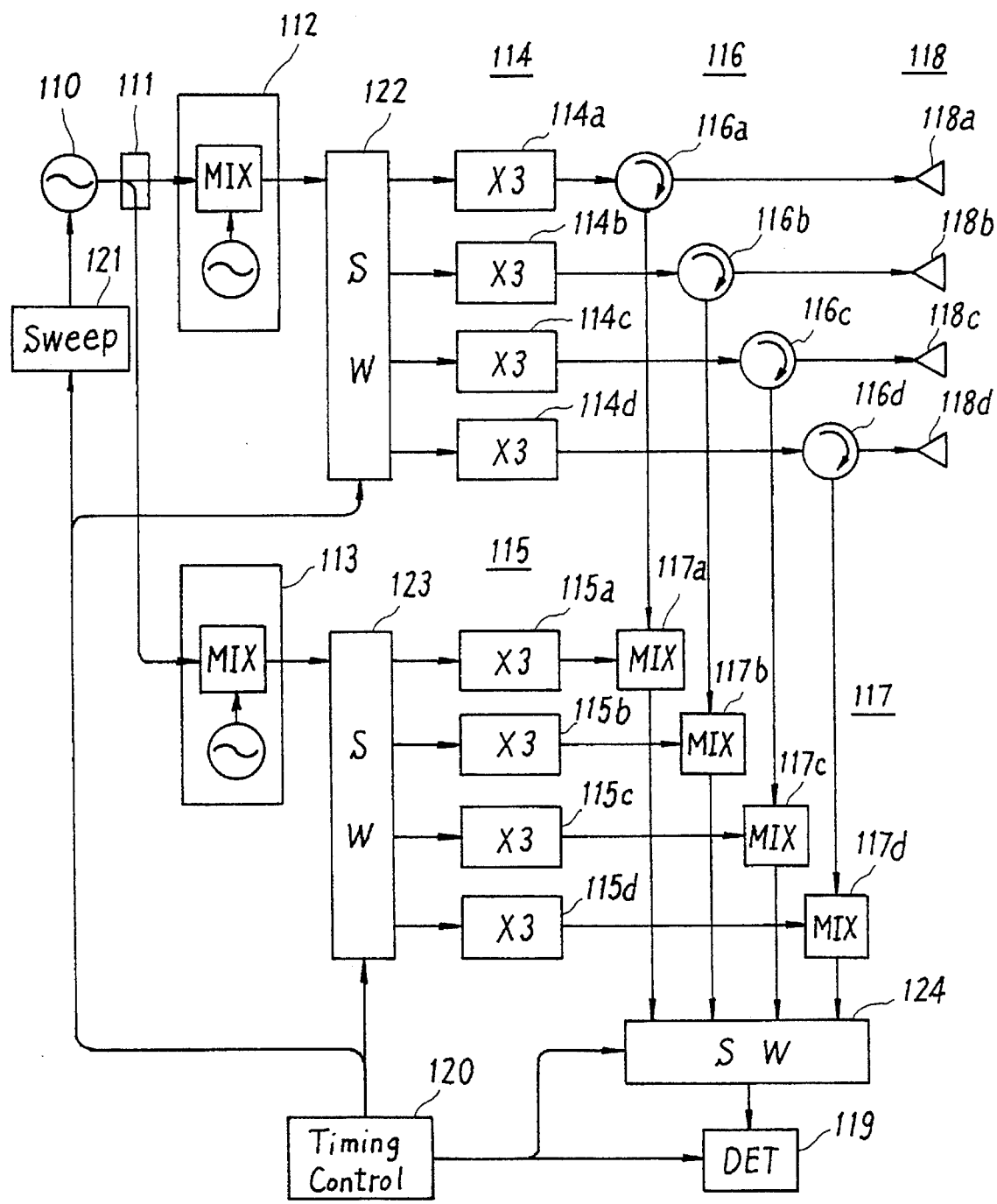
FIG. 4 is a block diagram of an FM radar system according to prior art.

FIG. 3 is a block diagram showing a configuration of a mm-wave FM radar system, which includes four transceivers as shown in FIGS. 1 and 2, for mounting on a vehicle. It may be noted that like elements appearing in FIGS. 3 and 4 are labelled with the same reference numerals. It is believed that labelling the elements in this fashion will facilitate a comparison of the systems illustrated in FIGS. 3 and 4, and that duplicative descriptions relating to the various elements will be minimized.

As shown in FIG. 3, each of four transceivers comprises a pair of transmitting antennas Ta–Td, a pair of receiving antennas Ra–Rd, a pair of frequency multipliers 114a–d and 115a–d, one mixer 117a–d, and one low noise amplifier AMPa–d. Each of the four transceivers corresponds to the transceiver shown in FIG. 1. With respect to the labelling of FIGS. 1 and 3, it should be noted that frequency multipliers 114a–d and 115a–d in FIG. 3 correspond to frequency multipliers 12 and 22 in FIG. 1, and that mixers 117a–d in FIG. 3 correspond to mixer 23 in FIG. 1.

In a preferred form, the four transceivers shown in FIG. 3 are mounted on front and rear portions and left and right sides of a vehicle. In addition, a common part (comprising switches 122, 123, and 124, mixers 112 and 113, detecting circuit 119, frequency oscillator 110, and timing control circuit 120) may be located together with one of the four transceivers TRa–TRd, or located in another position apart from any of the four transceivers.

It may be noted that none of the transceivers constructed as shown in FIGS. 1 or 3 contain circulators, which increase both the size and cost of a collision avoidance system. The circulators are eliminated by forming dedicated transmitting antennas and dedicated receiving antennas separately, as is clear by comparison to the configuration of FIG. 4.

Also, low noise amplifiers 24 for amplifying beat signals are configured separately on the dielectric plates 1 elements 24 comprising receivers (AMPa–AMPd in FIG. 3), while single low noise amplifiers are included within detecting circuit 119 following switching circuit 124 in the FM radar system of the prior art in FIG. 4. As a result, the same number of low noise amplifiers are required as the number of transceivers, but since such low noise amplifiers of a low frequency range are small in size and inexpensive, no serious deficiency arises. To the contrary, a number of advantage are achieved. In particular, increased accuracy of detection is achieved by locating low noise amplifiers in front of the switching circuit 124. In addition, the placement of low noise amplifiers in front of switching circuit 124 reduces propagation loss, thermal noise, and switching noise, thus improving the SN ratio of the system.

In a presently preferred form, the four transceivers are enabled successively according to their order of location around a vehicle by switching circuits 122, 123, and 124, each of which operates in sync with the timing signal supplied from the timing control circuit 120. This allows the collision warning system to scan for targets existing around the vehicle.

Finally, it may be noted that the distance of propagation of transmitted FM signals will be shorter compared to solid antennas such as parabolic antennas or horn-reflector antennas, since the antenna gain of a planar array antenna will be small compared to those solid antennas. Hence, the FM radar system of the present invention is especially preferable for use as a radar system for detecting obstacles near a vehicle to alert a driver of the vehicle of a potential collision.

Although an example is described in which frequency triple multipliers are used, other examples could be described in which double or quadruple frequency multipliers are used.

Although an example is described in which low noise amplifiers are configured on the dielectric plate, another example could be described in which low noise amplifiers are configured out of the dielectric plate.

While the invention has been described in detail and with reference to specific embodiments thereof, it will be apparent to those skilled in the art that various changes and modifications may be made therein without departing from the spirit and scope of the invention.

What is claimed is:

1. An FM radar system comprising:
   a transmitting part comprising a first input terminal, a frequency multiplier for multiplying the frequency of an FM signal supplied to said first input terminal to produce an FM signal of raised frequency, and a planar array antenna for transmitting said FM signal of raised frequency; and
   a receiving part comprising a planar array antenna for receiving an FM signal of a similar frequency band as said transmitted FM signal, a second input terminal, a frequency multiplier for multiplying the frequency of an FM signal supplied to said second input terminal to produce an FM signal of raised frequency, a mixer for producing beat signals by mixing said produced FM signal of raised frequency and said received FM signal, and an output terminal for outputting said produced beat signal;
   wherein said transmitting part and said receiving part each comprise one part of a transceiver and are disposed in mutually exclusive areas on a single dielectric plate.

2. The FM radar system of claim 1 wherein each of said first and second terminals are coupled to coaxial transmission lines.

3. An FM radar system comprising:
   a plurality of transceivers having one or more input and output terminals coupled through a plurality of switches to a single microwave generator of a single microwave detector successively, each of said plurality of switches and said microwave detector being coupled to a common timing control circuit for synchronous operation, and each of said transceivers comprising:
   a transmitting part comprising a first input terminal, and a planar array antenna for transmitting said FM signal; and
   a receiving part comprising a planar array antenna for receiving an FM signal of a similar frequency band as said transmitted FM signal, a second input terminal, a mixer for producing beat signals by mixing said FM signal and said received FM signal, and an output terminal for outputting said produced beat signal;
   wherein said transmitting part and said receiving part are disposed in mutually exclusive areas on a single dielectric plate.

4. The FM radar system of claim 3 wherein said transceivers are located around the sides of a car, and the input and output terminals of said transceivers are coupled to said single microwave generator and detector successively according to an order of transceiver location around said vehicle.

5. A radar device disposed on a single dielectric plate, said radar device comprising:
   a frequency multiplier for multiplying a frequency of a signal to a raised frequency;
   a transmitting antenna for transmitting a signal produced by said frequency multiplier;
   a receiving antenna for receiving a return signal, said return signal having been originally transmitted from said transmitting antenna and reflected by an object;
   a mixer for producing beat signals by mixing said return signal with a local signal relating to said signal transmitted from said transmitting antenna; and
   a shield disposed between said transmitting antenna and said receiving antenna for eliminating interference between said transmitting antenna and said receiving antenna.

6. The radar device of claim 5, wherein said transmitting antenna and said receiving antenna comprise a microstrip antenna.

7. The radar device of claim 5, wherein said shield comprises a metal shield plate.

8. The radar device of claim 5, wherein said single dielectric plate is supported by a metal box.

9. The radar device of claim 5, further comprising an amplifier for amplifying said beat signal produced by said mixer.

10. A radar device disposed on a single dielectric plate, said radar device comprising:
    a transmitting antenna for transmitting a signal of raised frequency;
    a receiving antenna for receiving a return signal, said return signal having been originally transmitted from said transmitting antenna and reflected by an object;
    a mixer for producing beat signals by mixing said return signal with a local signal related to said signal transmitted from said transmitting antenna;
    an amplifier for amplifying said beat signals produced by said mixer; and
    a shield disposed between said transmitting antenna and said receiving antenna for eliminating interference between said transmitting antenna and said receiving antenna.

11. The radar device of claim 10, wherein said signal of raised frequency is multiplied to achieve said raise to frequency by a multiplier.

12. The radar device of claim 10, wherein said transmitting antenna and said receiving antenna comprise a microstrip antenna.

13. The radar device of claim 10, wherein said shield comprises a metal shield plate.

14. The radar device of claim 10, wherein said single dielectric plate is supported in a metal box.

15. The radar device of claim 6, wherein said signal transmitted from said transmitting antenna is an FM signal.

16. The radar device of claim 10, wherein said signal transmitted from said transmitting antenna is an FM signal.

* * * * *